United States Patent
Saito et al.

(10) Patent No.: US 8,124,290 B2
(45) Date of Patent: Feb. 28, 2012

(54) OPERATING FUEL CELL DURING DOWN TIME ON CRYOGENIC HYDROGEN BOIL-OFF

(75) Inventors: Kazuo Saito, Glastonbury, CT (US); Joshua M. Cunningham, Davis, CA (US); Jung S. Yi, Phoenixville, PA (US); Zakiul Kabir, Glastonbury, CT (US); Michael L. Perry, South Glastonbury, CT (US)

(73) Assignee: UTC Power Corporation, South Windsor, CT (US)

( * ) Notice: Subject to any disclaimer, the term of this patent is extended or adjusted under 35 U.S.C. 154(b) by 629 days.

(21) Appl. No.: 12/225,856

(22) PCT Filed: Apr. 7, 2006

(86) PCT No.: PCT/US2006/012833
§ 371 (c)(1),
(2), (4) Date: Sep. 30, 2008

(87) PCT Pub. No.: WO2007/117229
PCT Pub. Date: Oct. 18, 2007

(65) Prior Publication Data
US 2009/0176135 A1 Jul. 9, 2009

(51) Int. Cl.
*H01M 8/04* (2006.01)
(52) U.S. Cl. ........ 429/429; 429/431; 429/436; 429/455; 429/515
(58) Field of Classification Search .................. 429/429, 429/430, 431, 436, 440, 455, 515
See application file for complete search history.

(56) References Cited

U.S. PATENT DOCUMENTS

| 5,728,483 | A | * | 3/1998 | Fujitani et al. | 429/515 X |
| 6,077,620 | A | * | 6/2000 | Pettit | 429/440 X |
| 6,495,277 | B1 | * | 12/2002 | Edlund et al. | 429/430 X |
| 6,753,105 | B2 | * | 6/2004 | Fleck et al. | 429/436 X |
| 6,800,390 | B2 | * | 10/2004 | Kashiwagi | 429/455 X |
| 7,014,930 | B2 | * | 3/2006 | Daniel et al. | 429/423 |
| 2004/0211192 | A1 | | 10/2004 | Lechner | |
| 2004/0229096 | A1 | * | 11/2004 | Standke et al. | 429/24 |

FOREIGN PATENT DOCUMENTS

| JP | 2003-187836 | * | 7/2003 |
| JP | 2005-086914 | * | 3/2005 |

* cited by examiner

*Primary Examiner* — Stephen J. Kalafut
(74) *Attorney, Agent, or Firm* — M. P. Williams

(57) ABSTRACT

A fuel cell power plant (9) includes a stack (10) of fuel cells, each including anodes (11), cathodes (12), coolant channels (13) and either (a) a coolant accumulator (60) and a pump (61) or (b) a condenser and cooler fan. During shutdown, electricity generated in the fuel cell in response to boil-off hydrogen gas (18) powers a controller (20), an air pump (52), which may increase air utilization to prevent cell voltages over 0.85 during shutdown, and either (a) the coolant pump or (b) the cooler fan. Operation of the fuel cell keeps it warm; circulating the warm coolant prevents freezing of the coolant and plumbing. The effluent of the cathodes and/or anodes is provided to a catalytic burner (48) to consume all hydrogen before exhaust to ambient. An HVAC in a compartment of a vehicle may operate using electricity from the fuel cell during boil-off.

14 Claims, 4 Drawing Sheets

OPERATING FUEL CELL DURING DOWN TIME ON CRYOGENIC HYDROGEN BOIL-OFF

TECHNICAL FIELD

This invention relates to operating a fuel cell power plant during a period when low or no demand is made from the fuel cell, and it might normally be shut down; operation utilizes boil off from a cryogenic hydrogen tank; electric power produced thereby operates a controller, an air blower and either a water circulating pump or a condenser fan; a catalytic burner consumes anode and/or cathode effluent.

BACKGROUND ART

It is known to operate fuel cell systems, particularly proton exchange membrane fuel cells, utilizing substantially pure hydrogen, frequently referred to as "industrial grade" hydrogen. Hydrogen in liquid form is retained in a cryogenic tank, which can reduce the amount of heat absorbed from the environment and therefore reduce the boiling of the hydrogen (which has a boiling point of 20° K, −253° C., 423° F.). When utilized in a fuel cell system, gas is tapped from the top of the cryogenic tank and fed, typically through a control valve, to the anodes of the fuel cell. When there is and will be no demand for power from the fuel cell power plant, it is typically shut down; during this period, the liquid hydrogen boils to some extent and the boil-off hydrogen gas is conventionally purged to ambient. This reduces system efficiency (by loss of fuel) and creates a safety issue.

PEM fuel cells which operate with substantially pure hydrogen typically employ a fuel recycle loop which may include a blower between the anode exit and the anode inlet of the fuel cell stack; the recycle both improves overall fuel utilization and avoids localized fuel starvation. If a blower is used in the recycle loop, condensation can occur in the blower when the system is not operating during cold weather. This may result in ice formation which interferes with blower operation.

Operation of the fuel cell power plant at near-zero current density to consume boil-off hydrogen, during periods of nominal shut down, allows the fuel cell voltage to become very high, which leads to deterioration of the cells and degradation of performance.

DISCLOSURE OF INVENTION

Aspects of the invention include: the reduction of hydrogen effluent from fuel cell power plants; freeze-tolerant proton exchange membrane fuel cell systems; restricting the purging of hydrogen boil-off to ambient during fuel cell power plant off-load conditions; providing more reliable fuel cell power plants; providing fuel cell power plants which are more economical to produce and to operate; improved efficiency of fuel utilization in fuel cell power plants; and improved proton exchange membrane fuel cell power plants.

This invention is predicated on the realization that the amount of boil-off from a cryogenic hydrogen source is sufficient to operate a fuel cell power plant in a manner to produce enough electricity to run a controller and a cathode air supply device, such as an air blower, and either (a) a coolant circulating device, such as a pump or (b) a condenser cooling device, such as a fan, and to generate enough heat to prevent freezing of any part of the fuel cell power plant, so long as there is any boil-off hydrogen remaining.

As used herein, the term "shut down" means a condition of the fuel cell power plant where there is either no external demand for power, or there is a disconnect preventing supplying power; the terms "boil-off operation" and "boil-off conditions" refer to operation of the fuel cell stack at a very low current density at a time when the power plant may or may not be satisfying any external demand. Herein, the term "external demand" includes all customer equipment other than the fuel cell power plant's auxiliary equipment, such as a controller, a cathode air blower, a coolant circulation pump or a condenser fan, a fuel recycle blower, a coolant heat exchange blower, or a coolant flow channel vent micro pump.

According to the present invention, a fuel cell power plant is fueled by natural boil-off hydrogen from a liquid hydrogen storage device, such as a cryogenic tank when operating at very low current density, such as on the order of less than 10% (typically in the range of 0.2%-5%) of normal maximum current density when satisfying a load. The electric power generated by the fuel cell power plant during boil-off operation, fueled by boil-off hydrogen, is utilized to operate a controller and a cathode air blower; the effluent from the cathode and/or the anodes may be fed to a catalytic burner, the purpose of which is to consume $H_2$ before purging the fuel exhaust to ambient. Operation of the fuel cell power plant keeps the fuel cell stack warm during shutdown, and warms any water or coolant therein.

In systems using convective cooling, e.g., by transfer of sensible heat to the coolant, circulating the warm coolant through the accumulator prevents the plumbing in the coolant flow path from freezing. The burner therefore need not be in thermal communication with the coolant accumulator, but it may be if desired in any particular use of the invention. The water circulation device, such as a pump, is powered by power from the fuel cell stack operating on boil-off fuel.

The invention may be incorporated in a fuel cell system using a natural water management approach that does not require a separate coolant loop but instead relies on evaporation and condensation of a liquid, typically water, into and out of at least one reactant gas stream, to cool the fuel cell stack. Power generated during boil-off operation of the stack operates a condenser cooling apparatus, such as a fan, and may operate a coolant channel vent micro pump.

According to the invention, the cathode air supply device is controlled so the fuel cell stack is provided with air at a high utilization (such as on the order of between 70% and 90%, for an ambient pressure fuel cell power plant that typically operates at about 60% utilization) which suppresses the high cell voltages associated with low current density operation used in consuming boil-off hydrogen during power plant shutdown. Typically, the invention keeps the cell voltage below about 0.850 volts per cell.

According further to the invention, the fuel cell power plant, operated during boil-off mode on boil-off hydrogen from the main hydrogen source, employs an ejector (or eductor) between the anode exit and the anode inlet, the ejector having its primary (control) inlet connected to the hydrogen source, its outlet connected to the anode inlets and its secondary inlet connected to the anode exits. This method can improve power plant efficiency by reducing the amount of hydrogen going to a burner or to ambient without consuming power to run a recycle pump during low current density boil-off operation. In this form of the invention using a fuel recycle ejector, the fuel cell power plant is less costly and more reliable because a fuel recycle blower is thereby rendered unnecessary at low current density operation. Even if a blower is used for high power operation, it need not be operated during boil-off operation because the ejector provides adequate recycle fuel.

In further accord with the invention, during boil-off operation, if enough additional power is available, heating and cooling functions in the passenger cabin of a vehicle may be operated, at least to some extent.

The invention provides a safer system since all boil-off hydrogen that is not consumed by the fuel cells is reacted in the burner, rather than purged to ambient. The system is freeze-resistant since the fuel cells are periodically operational and the water in the system never freezes; circulating coolant, when used, is warmed by circulation through the stack which prevents freezing of the coolant plumbing external to the stack.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
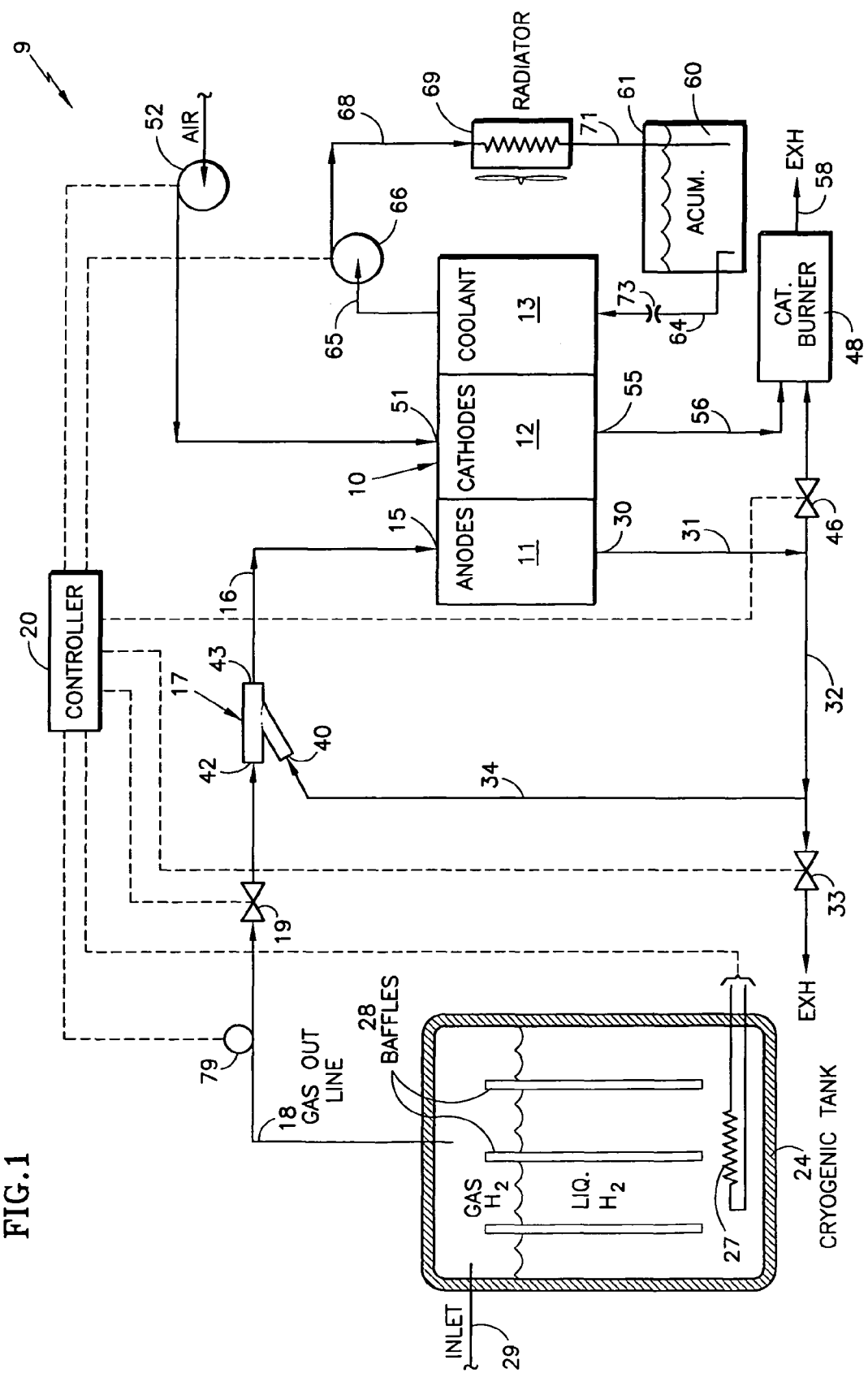
FIG. 1 is a simplified, stylized, block diagram of a portion of a convectively-cooled fuel cell power plant employing the present invention.
Figure 5:
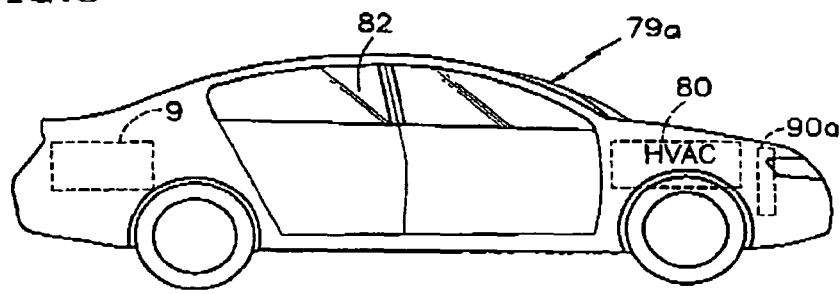
FIG. 5 is a simplified, stylized illustration of an HVAC for a passenger compartment operated by fuel cell power during boil-off conditions, according to the invention.

Referring to FIG. 1, a fuel cell power plant 9 includes a fuel cell stack 10 having anodes 11, cathodes 12 and coolant channels 13. Anode inlets 15 are supplied fuel over a conduit 16 from an ejector 17 which receives gaseous hydrogen from a gas outlet line 18 through a control valve 19. The control valve 19 is operated by a controller 20 that regulates the flow of fuel during normal operation to match the electrical power demand on the fuel cell power plant. The gas outlet line 18 passes through a wall of a cryogenic tank 24. A heater 27 is disposed in the cryogenic tank at the lowest level so as to be able to apply heat to liquid hydrogen within the cryogenic tank, in response to the controller 20. When the fuel cell is operating, the controller 20 will supply sufficient electric power to the heater 27 to ensure a hydrogen gas pressure that will deliver adequate flow through the control valve 19 and ejector 17 to the anode inlets 15. Many types of heating devices may be used to warm the $H_2$ liquid to increase the evaporation rate of $H_2$ gas and thereby pressurize the fuel system. During shutdown, the heater 27 receives no power, so the liquid becomes substantially quiescent, with only a small amount of boiling due to heat passing through the cryogenic tank from the surrounding ambient into the liquid $H_2$. The cryogenic tank 24 may have baffles 28 to reduce sloshing, particularly in a vehicle 79a (FIG. 5). The tank may be filled through an inlet 29.

Exits 30 of the anodes may be connected over conduits 31, 32 to a purge valve 33, and a conduit 34 to a secondary inlet 40 of the ejector 17. The primary (control) inlet 42 of the ejector is connected through the control valve to the source of hydrogen gas at the tube 18; the outlet 43 of the ejector is connected through the conduit 16 to the inlets 15 of the anodes. There may be a fuel recycle blower along the conduit 34 to assist fuel recycle flow at high power output, if necessary in any fuel cell system employing the invention.

The anode exits 30 are also connected through the conduit 31 to a valve 46 that allows flow of hydrogen effluent to a catalytic burner 48, which reduces the $H_2$ in the anode exhaust before purging to ambient. This valve is operated by the controller 20 during shutdown.

Inlets 51 to the cathodes 12 receive air from a pump 52, the operation of which in response to the controller 20 will determine the amount of air fed to the cathodes, thus setting the air utilization. The cathode exits 55 are connected over a conduit 56 to the catalytic burner 48. During shutdown, the oxygen in the cathode effluent and hydrogen in the anode effluent combine to product heat, the remaining gas being discharged through an exhaust 58, such as ambient, although there may be further processing of a conventional nature if desired. During normal operation, the cathode exhaust passes through the burner 48, substantially unchanged.

Liquid coolant 60 circulates from an accumulator 61 over a conduit 64, through the coolant channels of the fuel cells, over a conduit 65 to a circulating pump 66. The coolant flows from the pump through a conduit 68 and a radiator 69, which may be a vehicle radiator (90a, FIG. 5) when the fuel cell power plant is disposed in an electric vehicle, to cool the coolant during normal operation. The outflow of the radiator returns through a conduit 71 to the accumulator. The catalytic burner may be disposed in a fashion to provide heat generated therein to the accumulator, or it may be independent of the accumulator as shown in FIG. 1.

There may be an orifice 73 to cause a sufficient coolant pressure drop (of a few kPa or one or two psi) in order to provide proper bubble pressure to ensure separation of reactant gases and coolant in the fuel cells themselves, as is known. There may be a valve-controlled bypass around the radiator, and other apparatus, the details of which are independent of the present invention.

Figure 2:
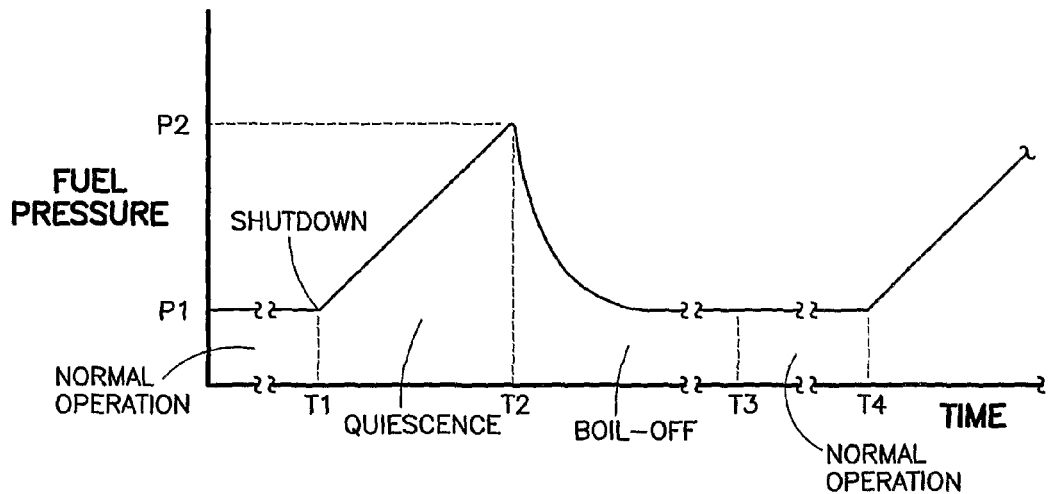
FIG. 2 is a plot illustrating operational modes in accordance with the invention.

FIG. 2 illustrates one mode of operating a fuel cell power plant incorporating the present invention. In this mode of operation, boil-off fuel is not consumed in the fuel cell until the pressure of fuel gas in the fuel container reaches a predetermined pressure, sensed by a pressure detector 79, typically well in excess of atmospheric pressure, that is set by structural and safety considerations of the fuel container and fuel supply system. As illustrated in FIG. 2, normal operation occurs at a first pressure, P1, which is set such that the fuel flow rates can be met at all designed operating conditions.

When normal operation is ended, typical shut down procedures will cause the supply of hydrogen to the anodes to stop when the valve 19 (FIG. 1) is closed. This shut down starts a quiescent period between time T1 and time T2 in FIG. 2. With the valve 19 closed, the pressure of hydrogen in the cryogenic tank 24 will continually increase until it reaches a predetermined pressure, P2, which may be less than 100 kPa, for example. When the pressure reaches P2, as indicated by a pressure sensor 79 (FIG. 1), the controller 20 will open the valve 19 and allow the flow of boil-off hydrogen to the fuel cell anode. At the same time the controller 20 will cause the air blower 52 to start supplying air at the proper rate to the cathode so the fuel cell can operate at a low level that consumes the boil-off hydrogen. A boil-off period extends from time T2 until time T3, in FIG. 2. Once the boil-off hydrogen is being consumed by the fuel cell stack, the pressure reduces to the predetermined pressure P1. This will continue until normal operation is resumed, such as at time T3 in FIG. 2. When normal operation is again ended at time T4, the quiescent period will begin once again as the pressure is allowed to rise to P2 once again.

Having the quiescent period simply reduces consumption of hydrogen. During the quiescent period (between time T1 and T2, and after time T4, in FIG. 2), the initial period of a shut down, the fuel cell stack will normally retain enough warmth so that it will not become frozen; however, a better practice may include draining the water from all of the coolant channels into the accumulator, and causing the accumulator to remain warm in any fashion known to the prior art. For instance, the accumulator may be highly insulated or may be heated by a battery or any other known way, if such is deemed to be proper in any fuel cell stack within which the present invention may be incorporated. The length of the quiescent period will of course vary in dependence upon the actual physical structure involved, and the limiting pressure, P2, which is appropriate for that structure.

Figure 3:
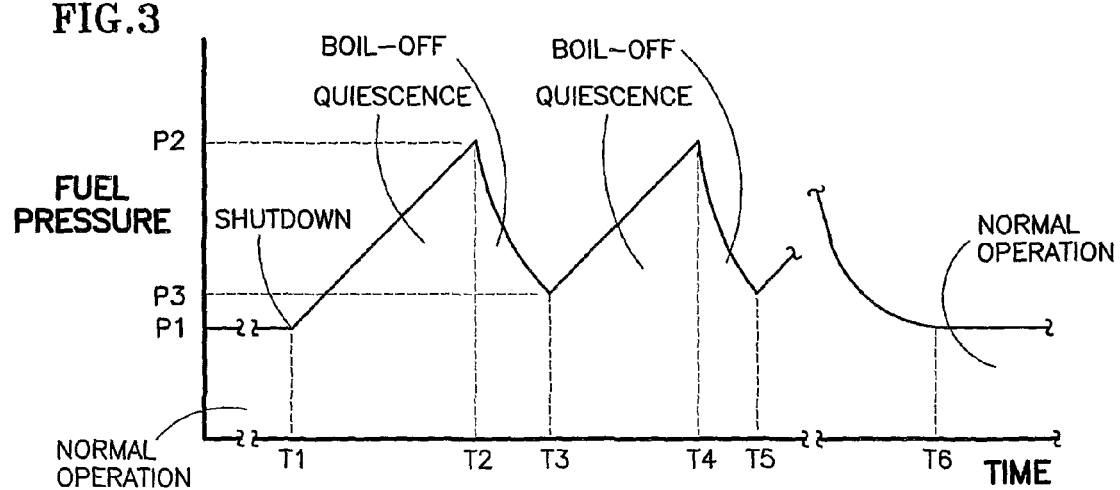
FIG. 3 is a plot illustrating alternative operating modes in accordance with the invention.

As illustrated in FIG. 3, for additional conservation of fuel, the boil-off period between time T2 and T3 may be ended at some pressure, P3, as illustrated in FIG. 3, and another quiescent period between times T3 and T4 resumed with the valve 19 closed. This can continue until normal operation is resumed, as is illustrated, for instance, at time T6. In such a case, quiescent periods would exist between times T1 and T2, between times T3 and T4, and after time T5. Boil-off periods extend from between times T2 and T3 and between times T4 and T5, as illustrated in FIG. 3.

The operation illustrated in FIGS. 2 and 3 is not the only way in which the present invention may be put to good use. If desired, such as may be appropriate in extremely cold ambients, boil-off may commence immediately and be contiguous with normal operation, allowing the valve 19 to remain open at some setting. Although normal operation is illustrated in FIGS. 2 and 3 as being at a constant pressure, T1, the amount of fuel which actually flows through the fuel cell will be determined by the demand on the cell, that is, the amount of electrical power being consumed. With higher power consumption, more fuel will flow from the cryogenic tank 24 as a consequence of variation in the setting of the valve 19, as is conventional.

The amount of time in the quiescent period (that is before the pressure gets to a limiting pressure P2) varies of course with the structure of the power plant in which the invention is implemented; however, it may be on the order of several hours, typically on the order of about 10 hours. The pressure P3 in FIG. 3 may be the same as the pressure P1, or some other pressure.

Figure 4:
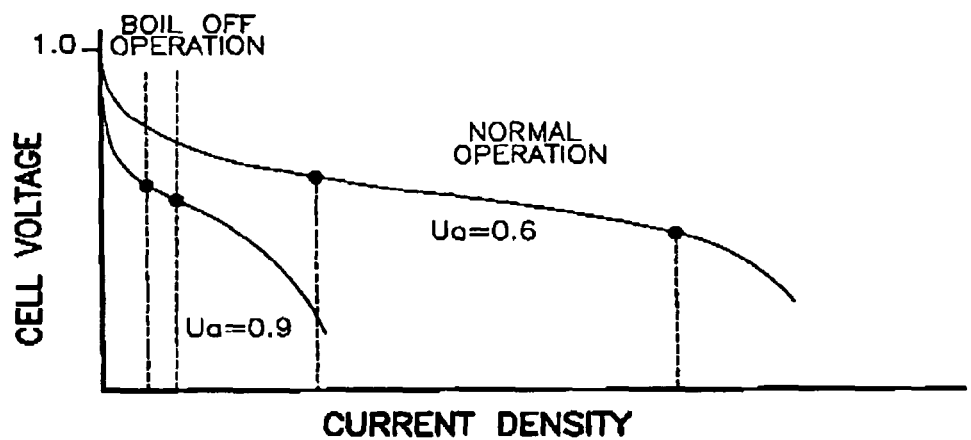
FIG. 4 is a plot of fuel cell stack performance.

FIG. 4 illustrates performance of an exemplary fuel cell stack, of a type and size which may be used in vehicles. At oxidant utilizations of 0.6 (166% of stochiometric amount), cell voltages range between about just over 0.5 volts and just over 0.7 volts within the range of normal operating current densities. However, when the current density is reduced to less than about 10% of maximum normal current density, the cell voltages easily exceed 0.85 volts, which is a threshold above which long term deterioration of the structures of the fuel cell power plant and reduced performance may occur.

According to the invention, during the boil-off period of shutdown, by increasing the oxidant utilization above 0.7 to about 0.9, the cell voltage is held below 0.85 volts even at low current densities which are set during boil-off conditions. The invention may be used in systems which vary oxidant utilization during normal, electric power producing operation (i.e., as a function of power demand).

Thus, utilizing the electric power generated by the boil-off fuel to (a) power a controller, which reduces stochiometry to a safe utilization of about 0.9, (b) operate an air pump, and (c) operate the water circulating pump to keep the water in the accumulator and circulation plumbing from freezing, allows the fuel cell stack itself to operate and thereby remain warm. Consumption of residual hydrogen from the anode effluent eliminates discharge of any significant hydrogen to atmosphere during boil-off.

The amount of power generated during boil-off conditions may well be sufficient to power additional apparatus. For instance, if the fuel cell power plant 9 is in a vehicle 79a as shown in FIG. 5, power may be used to operate a heating, ventilating and/or air conditioning system (HVAC) 80 associated with a passenger compartment 82.

The available power may be less than sufficient to achieve a desired heating or cooling effect (to reach a comfortable temperature), yet may be used to partially warm or cool a passenger compartment so that it will more quickly achieve a proper temperature, once the fuel cell stack resumes normal operation.

Figure 6:
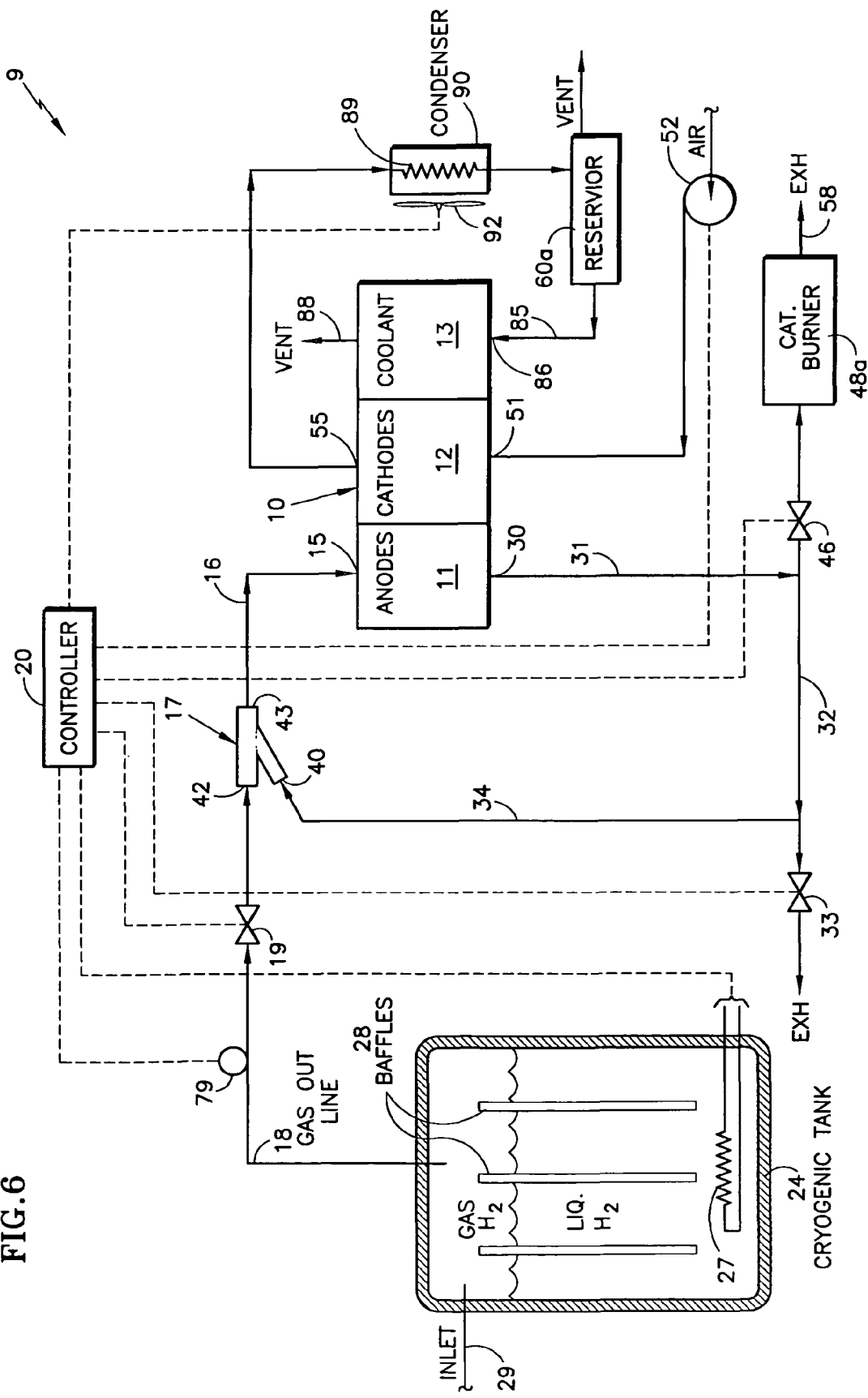
FIG. 6 is a simplified, stylized, block diagram of a portion of an evaporatively cooled fuel cell power plant employing the present invention.

FIG. 6 illustrates a fuel cell power plant 9 which employs evaporative cooling, rather than convectional cooling as in the embodiment of FIG. 1. In FIG. 6, there is no coolant circulation pump. Coolant is fed from a reservoir 60a over a conduit 85 to inlets 86 of the coolant channels 13. The coolant channels have a vent 88, which may be passive, such as a hydrophobic porous plug, or may be active and include a micro pump (such as low cost, consumer fish tank pump) in order to assure clearance of gas bubbles, the micro pump being operated on power generated by the fuel cell stack during boil-off conditions.

Water from the coolant channels evaporates into the reactant gas streams, particularly the air streams in the cathodes, thereby cooling the fuel cells. The exhaust through the cathode exits 55 contains significant water vapor which is fed through a coil 89 of a condenser 90. A fan 92 is typically used to cool the flow through the coil 89. The condenser 90 may be the radiator 90a of a vehicle, as illustrated in FIG. 5.

During boil-off operation, the fuel cell stack will provide power to the controller 20, the cathode air blower 52 and the fan 92 of the condenser, as well as a micro-pump associated with the vent 88, if any.

FIG. 6 also illustrates that the burner 48a need not receive air from the cathode exhaust: it may receive oxygen from some other source, such as ambient; it may comprise a diffusion burner. deriving oxygen from ambient.

The invention claimed is:

1. A method of operating a fuel cell power plant (9) comprising:

a fuel cell stack (10) including a plurality of fuel cells having anodes (11) with inlets (15) and outlets (30), cathodes (12) with inlets (51) and outlets (55), and coolant channels (13);

either (a) a coolant accumulator (60) and a coolant circulator (66) for circulating coolant through said accumulator and said coolant channels, or (b) a condenser (90) connected to said exits (55) of said cathodes (12), the condensate of said condenser in fluid communication (60a, 85) with said coolant channels (13), said condenser having a cooling device (92);

a controller (20);

a source (18, 24) of liquid hydrogen providing gaseous hydrogen in response to absorption of heat;

a fluid connection (16-19) between gaseous hydrogen from said source and the inlets of said anodes;

said method characterized by:
controlling the operation of said fuel cell power plant during fuel boil-off operation, to produce heat and electric power at less than about 10% of normal maximum current density when satisfying a load, in response to hydrogen gas boiling off from said source of liquid hydrogen; and
operating the controller, the cathode air pump and either (a) the coolant circulator or (b) the cooling device during fuel boil-off operation in response to electric power generated by said fuel cell stack.

2. A method according to claim 1 further characterized by:
during boil-off operation of said fuel cell power plant (9), providing the effluent from the outlets (30) of said anodes (11) to a catalytic burner (48, 48a).

3. A method according to claim 1 further characterized by:
said operating step comprises operating said coolant circulator (66); and
during boil-off operation of said fuel cell power plant (9), providing the effluent from the outlets (55) of said cathodes (12) and from the outlets (30) of said anodes (11) to a catalytic burner (48, 48a).

4. A method according to claim 1 further characterized by:
during boil-off operation of said fuel cell power plant (9) applying said electric power to a heating, ventilating and/or air conditioning system (80) associated with a habitable compartment (82).

5. A method according to claim 1 further characterized by:
said step of controlling comprises operating said fuel cell power plant (9) within a vehicle (79) during boil-off operation while applying said electric power to a heating, ventilating and/or air conditioning system (80) associated with a habitable compartment (82).

6. A method according to claim 1 further characterized by:
when said fuel cell power plant (9) is operating under boil-off conditions, providing air utilization to prevent fuel cell voltages from exceeding about 0.85 volts.

7. A fuel cell power plant (9), comprising:
a fuel cell stack (10) including a plurality of fuel cells having anodes (11) with inlets (15) and outlets (30), cathodes (12) with inlets (51) and outlets (55), and coolant channels (13);
either (a) a coolant accumulator (60) and a coolant pump (66) for circulating coolant through said accumulator and said coolant channels or (b) a condenser (90) connected to said exits (55) of said cathodes (12), the condensate of said condenser in fluid communication (60a, 85) with said coolant channels (13), said condenser having a cooling device (92);
a controller (20);
a source (18, 24) of liquid hydrogen providing gaseous hydrogen in response to absorption of heat;
a fluid connection (16-19) between gaseous hydrogen from said source and the inlets of said anodes;

characterized by:
means for controlling the operation of said fuel cell power plant during fuel boil-off operation to produce heat and electric power at less than about 10% of normal maximum current density when satisfying a load, in response to hydrogen gas boiling off from said source of liquid hydrogen, and for operating the controller, the cathode air pump and either (a) the coolant circulator or (b) the cooling device during fuel boil-off operation in response to electric power generated by said fuel cell stack.

8. A fuel cell power plant (9) according to claim 7 further characterized by:
a catalytic burner (48, 48a); and
means providing, during boil-off operation of said fuel cell power plant, the effluent from the outlets (30) of said anodes (11)to said catalytic burner.

9. A fuel cell power plant (9) according to claim 7 having a coolant accumulator (60) and a coolant circulator (66) further characterized by:
means providing, during boil-off operation of said fuel cell power plant, the effluent from the outlets (55) of said cathodes (12) and from the outlets (30) of said anodes (11) to a catalytic burner (48).

10. A fuel cell power plant (9) according to claim 7 further characterized by:
an ejector (17), the primary inlet (42) of which is connected (19) to said gaseous hydrogen from said source (18, 24), the outlet (43) of which is connected to said anode inlets (15), and the secondary inlet (40) of which is connected (31, 32, 34) to said anode outlets (30).

11. A method of operating a fuel cell power plant (9) characterized by:
when said fuel cell power plant is operating under fuel boil-off conditions, operating said fuel cell power plant in response to boil-off hydrogen fuel gas and using the power produced to operate a controller (20), a cathode air pump (52) and at least one of (a) a coolant circulator (66) and (b) a condenser cooling device (92).

12. A method according to claim 11 further characterized by:
applying effluent (30) of anodes (11) of fuel cells in said fuel cell power plant to a catalytic burner (48, 48a).

13. A method according to claim 11 further characterized by:
applying effluent (30, 55) of anodes (11) and cathodes (12) of fuel cells in said fuel cell power plant to a catalytic burner (48, 48a).

14. A method according to claim 11 further characterized by:
when said fuel cell power plant (9) is operating under boil-off conditions, providing air utilization to prevent fuel cell voltages from exceeding about 0.85 volts.

* * * * *